(12) United States Patent
Hills et al.

(10) Patent No.: US 8,921,472 B2
(45) Date of Patent: Dec. 30, 2014

(54) PROTECTIVE COATINGS FOR FLOORS FORMED FROM ORGANIC MATERIALS

(71) Applicant: Advanced Concrete Technologies LLC, Orem, UT (US)

(72) Inventors: Dal N. Hills, Midway, UT (US); Kent Barrus, Provo, UT (US)

(73) Assignee: Advanced Concrete Technologies LLC, Orem, UT (US)

( * ) Notice: Subject to any disclaimer, the term of this patent is extended or adjusted under 35 U.S.C. 154(b) by 0 days.

(21) Appl. No.: 13/678,324

(22) Filed: Nov. 15, 2012

(65) Prior Publication Data

US 2013/0089745 A1 Apr. 11, 2013

Related U.S. Application Data

(63) Continuation of application No. 13/016,748, filed on Jan. 28, 2011, now Pat. No. 8,344,057.

(60) Provisional application No. 61/299,874, filed on Jan. 29, 2010.

(51) Int. Cl.

| | | |
|---|---|---|
| *C08K 3/34* | (2006.01) | |
| *C08K 5/52* | (2006.01) | |
| *C09D 7/12* | (2006.01) | |
| *B05D 3/12* | (2006.01) | |
| *C09D 133/04* | (2006.01) | |
| *C08K 5/54* | (2006.01) | |

(52) U.S. Cl.
CPC ............... *C09D 7/1233* (2013.01); *B05D 3/12* (2013.01); *C09D 133/04* (2013.01); *C08K 3/34* (2013.01); *C08K 5/54* (2013.01)
USPC .......................................... 524/442; 524/140

(58) Field of Classification Search
CPC ...................................................... C09D 7/1233
USPC ......................................................... 524/442
See application file for complete search history.

(56) References Cited

U.S. PATENT DOCUMENTS 4,376,175 A 3/1983 Posten
5,998,525 A * 12/1999 Wang et al. ................... 524/425

* cited by examiner

*Primary Examiner* — Hui Chin
(74) *Attorney, Agent, or Firm* — Durham Jones & Pinegar Intellectual Property Law Group

(57) ABSTRACT

A composition for protecting a surface of an organic substrate, such as VCT, wood, or a synthetic laminate material, includes a silicate (i.e., an alkali metal polysilicate or colloidal silica) and a siliconate (e.g., a metal siliconate, such as an alkali metal methyl siliconate, etc.). In addition, the composition may include acrylic latex, a silane coupling agent, and a solvent, such as ethylene glycol monobutyl ether. Such a composition may also include a leveling agent, such as a surfactant. Organic substrates, such as VCT, wood, and synthetic laminate materials, with such a composition on their surfaces are also disclosed.

26 Claims, No Drawings

PROTECTIVE COATINGS FOR FLOORS FORMED FROM ORGANIC MATERIALS

CROSS-REFERENCE TO RELATED APPLICATIONS

This application is a continuation of U.S. patent application Ser. No. 13/016,748, filed on Jan. 28, 2011, and titled "PROTECTIVE COATINGS FOR ORGANIC SUBSTRATES AND ASSOCIATED METHODS" (hereinafter "the '748 Application"), which claims the benefit of priority under 35 U.S.C. §119(e), to U.S. Provisional Patent Application 61/299,874, filed on Jan. 29, 2010, and titled "PROTECTIVE COATINGS FOR ORGANIC SUBSTRATES AND ASSOCIATED METHODS" (hereinafter "the '874 Provisional Application"). The entire disclosures of both the '748 Application and the '874 Provisional Application are, by this reference, incorporated herein.

TECHNICAL FIELD

The present invention, in various embodiments, relates generally to compositions and methods for protecting and polishing substrates and, more specifically, to compositions that include silicates, such as polysilicates (e.g., lithium polysilicate, etc.) or colloidal silica. In particular, the present invention relates to compositions that include a silicate and one or more siliconates, or organosiliconates, as well as to the application of such compositions to various organic substrates. In a specific embodiment, the present invention relates to a composition that includes lithium polysilicate and a siliconate. Such a composition may, in some embodiments, be applied to organic substrates, such as vinyl composition tile (VCT).

RELATED ART

Use of Alkali Metal Silicates on Inorganic Substrates

Alkali metal silicates, such as potassium polysilicate and sodium polysilicate, have long been used to protect, harden, and polish inorganic substrates, such as cement. When applied to an inorganic substrate, alkali metal silicates react with free lime (calcium oxide, calcium hydroxide) in the inorganic substrate to prevent the surface of the inorganic substrate from becoming porous, or to reduce porosity at the surface of the inorganic substrate.

Over recent years, lithium polysilicates, which are also known in the art as "lithium silicates," have found widespread use in a variety of compositions that are formulated for application to inorganic substrates, such as concrete, masonry, and stone. Compositions that include lithium silicates may be formulated for a variety of purposes, including to protect, densify or harden, and/or polish the inorganic substrates to which they are applied.

The ever-increasing use of lithium silicate in connection with inorganic substrates has been due, in part, to its superior performance in penetrating and reacting with inorganic substrates when compared with other alkali metal polysilicates, such as potassium polysilicates and sodium polysilicates. Among other things, lithium silicate is less alkaline (i.e., has a lower pH) than other alkali metal silicates, which protects the inorganic substrate from undesirable reactions and improves the stability of the inorganic substrate. It has also been found that lithium silicate penetrates more quickly and further into inorganic substrates than other alkali metal silicates (possibly due to its smaller size than other alkali metal polysilicates), further enhancing the ability of lithium silicate to protect the inorganic substrates to which it is applied against staining and deterioration (such as that caused by wear, dusting, sweating, efflorescence, scaling, surface alkali silica reaction (ASR), damaging alkalis, etc.).

Organic Flooring

Vinyl composition tile (VCT) flooring is formed by compressing vinyl chips (under heat and pressure) into solid sheets, then cutting the sheets into tiles. The resulting tiles are inexpensive, durable (e.g., they are highly resilient, resisting abrasion and impact damage), and easy to maintain (e.g., they can be repeatedly refinished with chemical finishes and mechanical buffing equipment, they can be easily removed and replaced when damaged, etc). Thus, the use of VCT flooring is often favored over other types of flooring in high traffic commercial settings, such as stores, schools, and hospitals.

Conventionally, VCT and other types of organic flooring (e.g., other vinyl flooring materials, such as linoleum, polyvinyl chloride (PVC), and the like; hardwood; synthetic laminate flooring; etc.) have been protected by conventional floor waxes, particularly when a high gloss finish is desired. When wax is applied to a surface, such as VCT, it is typically applied in several (e.g., three to seven) relatively thick coats. When subjected to traffic, the protective coating that has been formed by the wax is scratched and scuffed. As the number of scratches and scuffs increases, the gloss of the protective wax coating decreases. In order to maintain the desired level of glossiness, the protective wax coating must be periodically reburnished, which consumes significant amounts of time. In addition, periodic reburnishing of waxed surfaces requires the use of organic solvents, such as butoxy ethanol, which are often harmful to the environment, as well as to the persons who use such solvents. In some settings, wax coatings on organic flooring substrates (e.g., VCT, etc.) are reburnished on a daily basis, requiring significant time and resources (e.g., burnishing pads, butoxy ethanol, etc.).

In addition to the undesired maintenance that wax coatings require, they must also be stripped and replaced periodically. In high traffic settings, such as stores, schools, and hospitals, wax protective coatings on flooring substrates (e.g., VCT, etc.) are often stripped and replaced every six to eight weeks. Due to their thicknesses, wax protective coatings must be stripped to prevent undesired wax buildup. Stripping requires the use of hazardous organic solvents, such as butoxy ethanol, and consumes a great deal of time, as the old wax must be collected and discarded. Frequent reapplication of wax protective coatings also consumes valuable time and resources (e.g., wax, burnishing pads, etc.).

SUMMARY

The present invention includes compositions for protecting organic substrates, such as VCT. In addition, the present invention includes methods for protecting exposed surfaces of organic substrates.

As used herein, the term "protect," when used in reference to an organic substrate, includes, but is not limited to, hardening, densifying, and at least partially sealing the organic substrate. Additionally, "protection" of an organic substrate may include polishing a surface of the organic substrate.

Various embodiments of compositions that incorporate teachings of the present invention include water, a siliconate, such as an alkali metal polysilicate (e.g., lithium polysilicate, potassium polysilicate, sodium polysilicate, etc.) or a colloidal silica, and a siliconate, such as a metal siliconate or, in some more specific embodiments, an alkali metal methyl siliconate (e.g., sodium methyl siliconate, potassium methyl siliconate, etc.), along with acrylic latex, a silane coupling agent (e.g., an epoxysilane, such as N-β(aminoethyl)-r-aminopropyl-trimethoxysilane, etc.), a solvent (e.g., a glycol solvent, such as ethylene glycol monobutyl ether, etc.), and an optional leveling agent. The leveling agent may comprise a surfactant (e.g., a fluorosurfactant, etc.) or an organic leveling agent (e.g., a silicone leveling agent, etc.). The components of a composition that incorporates teachings of the present invention are, in some embodiments, dispersed throughout the composition. In some embodiments, one or more of the components may be present in solution.

In another aspect, the present invention includes embodiments of methods for blending compositions that are useful for protecting organic substrates. One specific embodiment of such a method includes blending a surfactant and/or leveling agent into water, adding a solvent and/or silane coupling agent to the mixture, then adding a silane, a silicate, a siliconate, and acrylic latex. Another embodiment of a method for compounding a composition of the present invention includes mixing water and a solvent, optionally adding a surfactant to that mixture, then adding a silane coupling agent, a silicate, a siliconate, then acrylic latex.

The present invention also includes various embodiments of methods for protecting organic substrates. In such embodiments, an embodiment of a composition according to the present invention is applied to the organic substrate. A composition of the present invention may be sprayed onto a surface of the organic substrate and/or spread onto the surface of the organic substrate (e.g., with a microfiber mop, etc.). The surface of the organic substrate, with the composition thereon, may then be burnished in a manner known in the art (e.g., with a diamond-impregnated pad, etc.).

In a specific embodiment, an embodiment of a composition of the present invention is applied to a surface of an organic substrate, such as VCT. The composition may be sprayed and spread onto the surface of the VCT. The surface of the VCT may then be burnished. The application and burnishing processes may be repeated at least once. Such a process may protect the surface of the VCT, as well as provide it with a polished finish.

Other aspects of the present invention, as well as features and advantages of various aspects of the present invention, will become apparent to those of ordinary skill in the art through consideration of the ensuing description and the appended claims.

DETAILED DESCRIPTION

The present invention includes compositions for protecting the surfaces of organic substrates. In some embodiments, compositions of the present invention may also impart organic substrate surfaces with a polished finish. One embodiment of such a composition includes water, a silicate (e.g., an alkali metal polysilicate, etc.), acrylic latex, a siliconate, a silane coupling agent, and a solvent. Such a composition may optionally include a leveling agent, such as a surfactant. In some embodiments where a surfactant leveling agent is included, the surfactant may be a fluorosurfactant.

The following table lists various components that may be included in various embodiments of a composition according to the present invention, as well as possible amounts of each component in such a composition:

| Component | Percent (weight/weight) Range | Percent (weight/weight) Specific Embodiment |
|---|---|---|
| Water | Balance | 37.9 |
| Solvent (e.g., Ethylene Glycol Monobutyl Ether, Dipropylene Glycol Dimethyl Ether, Dipropylene Glycol n-Butyl Ether, etc.) | 0.5-2 | 1.0 (Ethylene Glycol Monobutyl Ether) |
| Leveling Agent (e.g., Fluoro Surfactant, Silicone Leveling Agent, Trialkyl Phosphate, etc.) | 0.1-2 | 0.1 (Silicone Leveling gent) |
| Silane Coupling Agent (e.g., N-β (aminoethyl)-r-aminopropyl-trimethoxysilane, etc.) | 1-5 | 4.0 |
| Silicate (e.g., Lithium Polysilicate, etc.) | 15-50 | 32.0 |
| Alkali Metal Methyl Siliconate (e.g., Potassium Methyl Siliconate, etc.) | 2-15 | 5.0 |
| Acrylic Latex | 4-50 | 20.0 |

All weight percentages in the preceding table and elsewhere throughout this disclosure account for the total weight of each component, including water.

While other components may be included some embodiments of a composition that incorporates teachings of the present invention, other embodiments consist essentially of water, a silicate, acrylic latex, a siliconate, a silane coupling agent, and a solvent, with the surfactant being a non-essential component. In other embodiments, a composition of the present invention consists of water, a silicate, acrylic latex, a siliconate, a silane coupling agent, and a solvent, while a surfactant, such as a fluorosurfactant, may be required in still other embodiments of a composition of the present invention.

In various embodiments, the solvent of a composition of the present invention may be a glycol solvent, such as ethylene glycol monobutyl ether. Ethylene glycol monobutyl ether is also known as "2-butoxyethanol" and as "Glycol Ether EB." It has the molecular chemical formula $C_6H_{14}O_2$ and the chemical structure $CH_3CH_2CH_2CH_2OCH_2CH_2OH$. Ethylene glycol monobutyl ether is a solvent for a variety of resins, including, without limitation, acrylic resins. As a solvent, ethylene glycol monobutyl ether enhances wettability of a composition of the present invention. Ethylene glycol monobutyl ether is available from a variety of sources, including the Dow Chemical Company of Midland, Mich., Eastman Chemical Company of Kingsport, Tenn., and Lyondell Chemical Company of Houston, Tex.

Other examples of solvents that may be used in various embodiments of compositions according to the present invention include, but are not limited to, dipropylene glycol dimethyl ether and dipropylene glycol n-butyl ether. Dipropylene glycol dimethyl ether has the chemical formula $CH_3OCH_2CH(CH_3)OCH_2CH(CH_3)OCH_3$ (major isomer). The Dow Chemical Company sells dipropylene glycol dimethyl ether under the trademark PROGLYDE™ DMM. The chemical formula of dipropylene glycol n-butyl ether is $C_4H_9O[CH_2CH(CH_3)O]_2H$ (major isomer). Dipropylene glycol n-butyl ether is available from The Dow Chemical Company under the trademark DOWANOL® DPnB.

A silane coupling agent of a composition of the present invention may have at least two reactive groups of different types bonded to a silicon atom in the molecule. One of the reactive groups (e.g., a methoxy group (—$OCH_3$), an ethoxy group (—$OCH_2CH_3$), a silanic hydroxyl group (—SiOH), etc.) is reactive with an inorganic material, while another of the reactive groups (e.g., a vinyl group (—CH═$CH_2$), an epoxide (in which an oxygen atom is covalently bonded to two adjacent, covalently bonded carbon atoms, forming a three-member ring), a methacryl group ($CH_2=C(CH_3)C(O)—$), an amino group (—$NH_2$), a thiol or mercapto group (—SH), etc.) is reactive with an organic material. These two reactive groups of the silane coupling agent bind inorganic components (e.g., the silicate, etc.) and organic components (e.g., the siliconate, etc.) of a composition of the present invention to each other. It is also believed that the two reactive groups of the silane coupling agent enhance adhesion of a composition of the present invention to an organic substrate (e.g., a vinyl material, such as VCT, linoleum, PVC, etc.; wood; a synthetic laminate material; a rubberized flooring material; etc.). In addition to its binding and potential adhesive properties, the silane coupling agent may serve as a sealant and/or as a water repellant.

In a specific embodiment, the silane coupling agent of a composition of the present invention may comprise or consist of an aminoethyl aminopropyl trimethoxy silane ($C_8H_{22}N_2O_3Si$), which is known by the chemical names N-β(aminoethyl)-r-aminopropyl-trimethoxysilane, [3-(2-Aminoethyl)aminopropyl]trimethoxysilane, and N-[3-(Trimethoxysilyl)propyl]ethylenediamine. Such a material is available from Dow Corning Corporation of Midland, Mich., as Z-6020, as well as from a variety of other sources.

The silicate of various embodiments of a composition of the present invention may comprise an alkali metal polysilicate, such as lithium polysilicate. In alternative embodiments, the silicate may comprise an alkali metal polysilicate, such as potassium polysilicate, sodium polysilicate, and/or a colloidal silica in place of or in addition to the lithium polysilicate. Silicates are available from a variety of sources. For example, Grace Davison, a subsidiary of the Grace Performance Chemicals division of W. R. Grace & Co. of Columbia, Md., sells lithium polysilicate under the trade name LUDOX®. Various silicates are also manufactured by PQ Corporation of Malvern, Pa.

Silicates, which are inorganic materials, may impart a cured or solidified form of a composition of the present invention (e.g., a coating, etc.) with a desired hardness, which may further prevent abrasion or impact damage to the organic substrate. Silicates may also chemically react with components of some organic substrates to further enhance the hardness that the silicates otherwise provide. As an example, silicates may chemically react with various materials of organic substrates, such as the calcium carbonate binders that are frequently used in VCT.

In addition to imparting a composition of the present invention with hardness, a silicate may provide some water repellency, as well as minimize or eliminate corrosion of an organic substrate to which the composition is applied (e.g., on which a coating that comprises a cured or solid form of the composition is formed, etc.).

Further water repellency may be provided by the siliconate of a composition of the present invention. In some embodiments, the siliconate may comprise a metal siliconate, such as an alkali metal siliconate (e.g., potassium methyl siliconate and/or sodium metal siliconate, etc.) all of which are manufactured by Dow Corning. In a specific embodiment, the siliconate of a composition of the present invention consists of the potassium methyl siliconate available from Dow Corning as XIAMETER® 0777. In such embodiments, the composition lays out, or spreads, well. Thus, there may be no need for a leveling agent (e.g., a fluorosurfactant, etc.) in such embodiments.

Acrylic latex is an emulsion of an acrylic polymer in water. In a composition of the present invention, acrylic latex may facilitate adhesion of the composition to an organic substrate. In a specific embodiment, the acrylic latex may have a solids content of about 47% to about 49%, such as the PLIOTEC® PA90 acrylic latex available from Eliokem of Villejust, France. Another example of an acrylic latex that may be used in various embodiments of compositions according to the present invention is AVANSE™ MV-100 from The Dow Chemical Company.

In embodiments of compositions that include surfactants, nonionic fluorinated surfactants, or "fluorosurfactants," may be used. Fluorosurfactants are more effective than ionic (hydrocarbon) surfactants at reducing the surface tension of water and, thus, the surface tension of a composition in which they are included. The reduced surface tension of a composition that includes one or more fluorosurfactants may facilitate wetting of an orgainic substrate surface with the composition, as well as spreading and leveling of the composition on the surface of the organic substrate. The inclusion of a fluorosurfactant in a composition of the present invention may also enable a composition of the present invention to penetrate smaller voids in an organic substrate than may be penetrated by embodiments of compositions that lack fluorosurfactants (i.e., that include other types of surfactants or that lack surfactants). A specific embodiment of a composition of the present invention includes the fluorosurfactant marketed as MASURF® FS-120A by Mason Chemical Company of Arlington Heights, Ill. In another specific embodiment, a composition of the present invention may include a fluorosurfactant that comprises a short chain molecule (e.g., four carbon atoms, etc.), such as the perfluorobutanesulfonic acid-based fluorosurfactants marketed by 3M of St. Paul, Minn., under the trade name NOVEC™.

As an alternative to a surfactant, or in addition thereto, a composition according to the present invention may include a leveling agent of a type known in the art. Like surfactants, leveling agents enable a composition of the present invention to wet and smoothly coat an organic substrate and, in the case of organic substrates that are formed from porous materials, to penetrate the organic substrate. One example of a leveling agent is the silicon leveling agent available from Dow Corning under the trade name DOW CORNING® 2-9034 Emulsion. Another example of a leveling agent is trialkyl phosphate, such as the tris(2-butoxyethyl)phosphate having the chemical formula $C_{18}H_{39}O_7P$ available from Chemtura Corporation of Philadelphia, Pa., as KRONITEX® KP-140 ("KP-140").

In addition to acting as a leveling agent, KP-140 may reduce or eliminate foaming as a composition that incorporates teachings of the present invention is compounded and/or used. When relatively small amounts (e.g., less than about 0.3% w/w, about 0.2% w/w, about 0.1% w/w, etc.) of KP-140 are used in a composition of the present invention, the composition may harden more quickly than, and may reduce soiling better than, compositions that include relatively large amounts (e.g., about 0.3% w/w, more than about 0.3% w/w, etc.) of KP-140.

The following EXAMPLES identify components of some additional specific embodiments of compositions that incorporate teachings of the present invention.

EXAMPLE 1

| Component | Percent (weight/weight) |
| --- | --- |
| Water | 54.671 |
| Trialkyl Phosphate (e.g., KRONITEX ® KP-140 from Chemtura Corporation) | 0.3 |
| Dipropylene Glycol Dimethyl Ether (e.g., PROGLYDE ™ DMM from The Dow Chemical Company) | 0.55 |
| Silane (e.g., DOW CORNING Z-6020 ® from Dow Corning Corporation) | 2.149 |
| Lithium polysilicate | 18.3 |
| Potassium Methyl Siliconate | 2.69 |
| Latex (e.g., AVANSE ™ MV-100 from The Dow Chemical Company) | 21.34 |

A composition having the formulation set forth in EXAMPLE 1 becomes resistant to standing water about twenty-four (24) hours to about thirty-six (36) hours after it has been applied to and allowed to dry on an organic substrate, such as VCT.

EXAMPLE 2

| Component | Percent (weight/weight) |
| --- | --- |
| Water | 39.99 |
| Dipropylene Glycol n-Butyl Ether (e.g., DOWANOL ® DPnB from The Dow Chemical Company) | 1.00 |
| Silane (e.g., DOW CORNING Z-6020 ® from Dow Corning Corporation) | 3.81 |
| Lithium polysilicate | 30.20 |
| Potassium Methyl Siliconate | 5.00 |
| Latex (e.g., AVANSE ™ MV-100 from The Dow Chemical Company) | 20.00 |

The composition of EXAMPLE 2 may be applied directly to an organic substrate, or it may comprise a concentrate, which may be diluted with water before application to an organic substrate. In a specific embodiment where the composition of EXAMPLE 2 comprises a concentrate, it may be diluted with water at a ratio of 1:1, by weight or volume, before application to an organic substrate. The resulting diluted composition hardens quickly (more quickly than the compositions of EXAMPLES 1 and 3), but it takes about seven (7) days or longer from application and drying on the surface of an organic substrate before the resulting film and, thus, the surface of the organic substrate resists standing water.

EXAMPLE 3

| Component | Percent (weight/weight) |
| --- | --- |
| Water | 53.364 |
| Trialkyl Phosphate (e.g., KRONITEX ® KP-140 from Chemtura Corporation) | 0.3 |
| Dipropylene Glycol n-Butyl Ether (e.g., DOWANOL ® DPnB from The Dow Chemical Company) | 0.7 |

-continued

| Component | Percent (weight/weight) |
| --- | --- |
| Silane (e.g., DOW CORNING Z-6020 ® from Dow Corning Corporation) | 1.916 |
| Lithium polysilicate | 16.32 |
| Potassium Methyl Siliconate | 2.4 |
| Latex (e.g., AVANSE ™ MV-100 from The Dow Chemical Company) | 25.0 |

When the composition of EXAMPLE 3 is applied to an organic substrate, it may resist standing water within about thirty (30) minutes after it has dried. The composition of EXAMPLE 3 flows and levels on the surfaces of organic substrates better than the compositions of EXAMPLES 1 and 2, with less streaking than those compositions, making it easier to apply than the compositions of EXAMPLES 1 and 2. It remains relatively soft for about four (4) or five (5) days, however.

In another aspect, the present invention includes embodiments of methods for blending compositions that are useful for protecting organic substrates. One specific embodiment of such a method includes mixing water and a solvent, optionally adding a leveling agent to that mixture, then adding a silane coupling agent, a silicate, a siliconate, then acrylic latex. In an even more specific embodiment, the surfactant and/or leveling agent may be "sweated" into the water. Sweating may include mixing using high shear agitation, in a manner known in the art. Sweating may be effected for a sufficient period of time for the surfactant and/or leveling agent to be completely dissolved and/or homogeneously dispersed throughout the water. In some embodiments, the surfactant and/or leveling agent may be sweated into the water for a period of about thirty (30) minutes. In embodiments where a solvent is used, the solvent may also be sweated into the water and any previously included component (e.g., a surfactant, a leveling agent, etc.). As with sweating a surfactant and/or a leveling agent into water, the process of sweating a solvent into water or an aqueous solution or suspension may include mixing or agitation, and may be effected for a sufficient duration to enable the solvent to completely dissolve and/or be homogeneously dispersed throughout the water.

In addition, the present invention includes methods for protecting organic substrates. An embodiment of a composition according to the present invention may be applied to the surface of an organic substrate (e.g., by spraying, etc.) then spread (e.g., with a microfiber mop, etc.). The composition may be applied in one coat or in a plurality of coats.

In some embodiments, the surface of the organic substrate, with the composition thereon, may then be polished or burnished in a manner known in the art (e.g., with a diamond-impregnated pad, etc.). In embodiments where more than one coat of the composition is to be applied to an organic substrate, the surface to which the composition is applied (and the composition on that surface) may be polished or burnished after each application.

In a specific embodiment, a composition of the present invention is applied to a surface of an organic substrate (e.g., a vinyl material, such as VCT, linoleum, PVC, etc.; wood; a synthetic laminate material; a rubberized flooring material; etc.). The composition may be sprayed and/or spread onto the surface of the organic substrate. The surface of the organic substrate may then be burnished, particularly where the organic substrate comprises a floor (e.g., a VCT floor, a linoleum floor, a PVC floor, a hardwood floor, laminate flooring, a rubberized floor, etc.). The application and/or burnishing processes may be repeated at least once. Such a process may protect the surface of the organic substrate, as well as provide it with a polished finish.

When such a process is employed (e.g.; on a vinyl material, such as VCT, linoleum, PVC, etc.; wood; a synthetic laminate material; a rubberized flooring material; or any other organic substrate), each layer of the coating may have a thickness of about 5 µm to about 6 µm, which may be significantly thinner than a layer of wax. The glossiness of the coating, which may be measured with a gloss meter of a type known in the art in terms of percentage of light reflected at an angle of 60° to a surface of the substrate, may be up to about 80% or more.

When applied to a floor that is subjected to moderate to heavy levels of traffic, a coating of a composition of the present invention may have a useful life at least six months, and may last for as long as two years or more, as opposed to a useful life for a protective wax coating of about six weeks with frequent (e.g., daily, weekly, etc.) reburnishing in high traffic areas. Due to its hardness, a coating of the present invention may retain its shine and exhibit little or no wear over the life of the coating. If desired, however, a coating of the present invention may be reburnished from time to time, without the requirement of environmentally unfriendly chemicals, such as the butoxy ethanol that is typically used when waxed flooring surfaces are reburnished.

At the end of its useful life, a coating of the present invention need not be stripped from the surface of an organic substrate, as is required when wax is used. Due to the thickness (or, rather, thinness) of the worn coating(s), another coating may simply be applied atop the worn coating(s). When such a technique is used, the new coating will have substantially the same appearance (e.g., glossiness, etc.) as the original coating. By eliminating the need to strip the worn coating, the use of environmentally unfriendly chemicals is avoided, as is the mess (e.g., clumps of old wax, etc.) that is typically associated when conventional protective coatings are stripped from organic substrates (e.g., waxes from floors, etc.).

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A floor, comprising:
   an organic substrate defining a floor surface; and
   at least one first product on the floor surface, the at least one first product comprising a product of one or more reactions between components of a composition including a silicate, a siliconate, acrylic latex, and a silane coupling agent; and
   at least one second product of one or more reactions between at least one component of the composition and an organic material exposed at the floor surface,
   the at least one first product and/or the at least one second product imparting the floor surface with a glossiness that, when light is directed toward at least one of the at least one first product and the at least one second product at an angle of 60° to the floor surface, about 80% or more of the light is reflected.

2. The floor of claim 1, wherein the at least one first product comprises at least one of polymer on the floor surface.

3. The floor of claim 2, wherein the at least one polymer comprises a polymer formed from the siliconate, the acrylic latex, or the silane coupling agent.

4. The floor of claim 1, wherein the at least one second product comprises at least one of:
   a product of a reaction between the organic material and the silicate; and
   a product of a reaction between the organic material and the silane coupling agent.

5. The floor of claim 1, wherein the organic substrate comprises vinyl composition tile, an organic laminate, wood or a wood laminate, or a rubberized flooring surface.

6. A floor, comprising:
   an organic substrate defining a floor surface; and
   a product on the floor surface, the product comprising a product of a reaction between molecules of at least one component of a composition including a silicate and a siliconate, the product imparting the floor surface with a glossiness that, when light is directed toward at least one of the products at an angle of 60° to the floor surface, about 80% or more of the light is reflected.

7. The floor of claim 6, wherein the product comprises a polymer.

8. The floor of claim 6, wherein the polymer comprises a polymer formed at least in part by the siliconate.

9. The floor of claim 6, wherein the polymer comprises a polymer formed at least in part by at least one of an acrylic latex and a silane coupling agent of the composition.

10. The floor of claim 6, wherein the organic substrate comprises vinyl composition tile, an organic laminate, wood or a wood laminate, or a rubberized flooring surface.

11. A floor, comprising:
    an organic substrate defining a floor surface; and
    a product of a reaction between at least one component of a composition including a silicate and a siliconate and an organic material exposed at the floor surface, the product imparting the floor surface with a glossiness that, when light is directed toward at least one of the products at an angle of 60° to the floor surface, about 80% or more of the light is reflected.

12. The floor of claim 11, wherein the product comprises a polymer.

13. The floor of claim 11, wherein the product comprises a product formed at least in part by a silicate and/or a silane coupling agent of the composition.

14. The floor of claim 13, wherein the product comprises a product formed at least in part between the silicate and the organic material and/or the silane coupling agent and the organic material.

15. The floor of claim 11, wherein the organic substrate comprises vinyl composition tile, an organic laminate, wood or a wood laminate, or a rubberized flooring surface.

16. A floor, comprising:
    a synthetic organic substrate defining a floor surface; and
    a product on the floor surface, the product comprising a product of at least one of:
      a reaction between molecules of at least one component of a composition that has been applied to the floor surface, the composition including a silicate and a ciliconate; and
      a reaction between at least one component of the composition and a synthetic organic material exposed at the floor surface.

17. The floor of claim 16, wherein the product comprises a polymer.

18. The floor of claim 17, wherein the polymer comprises a polymer formed at least in part by the siliconate of the composition.

19. The floor of claim 18, wherein the polymer comprises a polymer formed at least in part by acrylic latex and/or a silane coupling agent of the composition.

20. The floor of claim 16, wherein the product is formed at least in part by acrylic latex and/or a silane coupling agent of the composition.

21. The floor of claim 20, wherein the product comprises a product formed at least in part between the silicate and the synthetic organic material and/or the silane coupling agent and the organic material.

22. The floor of claim 16, wherein the synthetic organic material comprises vinyl composition tile, an organic laminate and a rubberized flooring surface.

23. A floor, comprising:
    a synthetic organic substrate defining a floor surface; and
    a product on the floor surface, the product formed at least in part by one or more components of a composition comprising a silicate and a siliconate.

24. The floor of claim 23, wherein the product is formed at least in part by the silicate or the siliconate.

25. The floor of claim 23, wherein the product is formed at least in part by acrylic latex of the composition and/or a silane coupling agent of the composition.

26. The floor of claim 23, wherein the product imparts the floor surface with a glossiness that, when light is directed toward at least one of the products at an angle of 60° to the floor surface, about 80% or more of the light is reflected.

\* \* \* \* \*